No. 762,843. PATENTED JUNE 14, 1904.
R. B. PRICE.
METHOD OF REGENERATING VULCANIZED RUBBER.
APPLICATION FILED MAY 26, 1904.
NO MODEL.
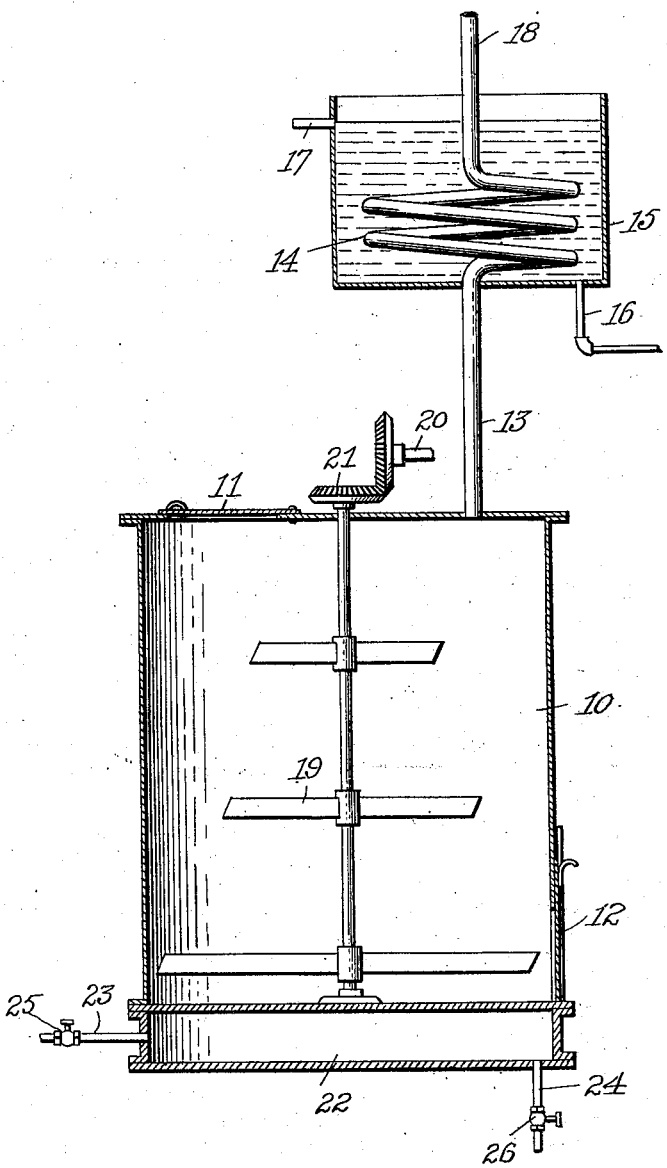

No. 762,843.

Patented June 14, 1904.

UNITED STATES PATENT OFFICE.

RAYMOND B. PRICE, OF CHICAGO, ILLINOIS.

METHOD OF REGENERATING VULCANIZED RUBBER.

SPECIFICATION forming part of Letters Patent No. 762,843, dated June 14, 1904.

Application filed May 26, 1904. Serial No. 209,819. (No specimens.)

*To all whom it may concern:*

Be it known that I, RAYMOND B. PRICE, a citizen of the United States, and a resident of Chicago, in the county of Cook and State of Illinois, have invented certain new and useful Improvements in Methods of Regenerating Vulcanized Rubber, of which the following is a full, clear, and exact description.

In the familiar Goodyear method crude rubber admixed with sulfur is vulcanized by subjecting the mixture to a high heat, frequently about 350° Fahrenheit. As is well known, once the batch attains the melting-point of sulfur (232° Fahrenheit) and passes beyond the characteristic reactions distinctive of the vulcanized product proceed at accelerated speed. In similar fashion the present invention—having regard to what may be termed the "critical" point, as fixed by the temperature at which sulfur melts (232° Fahrenheit)—designs to regenerate the vulcanized waste by treating it with caustic solutions of marked strength, which under ordinary atmospheric pressure boil at or generally much above the critical point named. A solution of the selected sort may frequently show sixty-six per cent. caustic, and thus contain an amount of the reagent—*e. g.*, caustic soda—far in excess of the amount capable of dissolution at ordinary temperatures.

The invention rests upon the discovery that caustic solutions of such high strength can be safely employed without detriment and, indeed, with marked advantage not only in reducing the duration of treatment and allowing the work to go on, if preferred, in open vessels accessible for ready inspection of the charge, but far more by effecting a completer removal of many of the fillers—such as zinc oxid or sulfid, litharge, red or white lead, lead sulfate or sulfid, &c., all of which freely respond to the solvent action of the strong caustic—with the result finally of producing a recovered waste low in specific gravity, relatively uniform in quality, and of unusual stability when revulcanized.

Solutions having two hundred parts caustic for every one hundred parts water boil at about 350° Fahrenheit in the open air. By increasing the content of caustic soda the boiling-point is correspondingly advanced; but any increase in the soda present calls for more assiduous or repeated washing after the treatment is over, and because of this is not generally advisable. Moreover, should the temperature be carried too far it may injure the rubber, or at any rate demand closer supervision of the work than is worth while on comparison with the results obtained by using a compound of lower causticity—say one boiling in the air at 350° Fahrenheit. On the other hand, solutions of comparatively lower strength—say with one hundred and twenty parts caustic to one hundred parts water—boil in the open air at about 300° Fahrenheit. When the character of the waste justifies, a solution of such sort may be readily taken; but the lower content of caustic lessens the speed of treatment and, besides, is apt to afford a somewhat inferior product. By diminishing the percentage of caustic soda even more the boiling-point of the solution gradually approximates unto the melting-point of sulfur—viz., about 232° Fahrenheit—although practically it is not deemed advisable to work the charge at so low a range, because in analogy to the vulcanizing method with temperature rising to 350° Fahrenheit or even higher the devulcanizing method proceeds ordinarily to better advantage under nearer approximation to the same high degree of heat.

Were the charge confined in a closed vessel conveniently heated, for example, by steam admitted under pressure to the vessel-jacket in familiar fashion, it becomes entirely feasible to raise the temperature of the caustic solution, boiling in the air, say, at 250° Fahrenheit, so that it will show a temperature of 350° Fahrenheit, or even more, in the charge. This well-known mode of increasing the heat by resort to pressure, although quite within the scope of the invention, has it objections. The fumes evolved in course of treatment cannot be freely vented, as in the case of the open vessel, and if vented at frequent intervals, which is decidedly requisite for best results, fluctuations in temperature necessarily ensue. Besides, a solution of strength sufficient to show a boiling-point of 350° Fahrenheit under ordinary atmospheric conditions presents a much larger content of free caustic to the waste than if its strength were less and its heat at boiling were supplemented by confining the charge under pressure.

Water dissolves about forty-seven per cent. of common caustic soda before it reaches the point of saturation. At ordinary temperatures a strong supersaturated solution shows a thick syrupy consistency; but it thins out more and more as the heat rises toward the working temperature fixed upon. The higher the percentages of caustic the less is the time consumed in dealing with the batch and the better is the quality of the rubber recovered. However, with the high percentages of caustic more time must be spent in washing the regenerated product, so that a solution having about two hundred parts of caustic to every one hundred parts of water is found to be in the main the most satisfactory limit for a batch treated either wholly without pressure or else at a pressure of insignificant range, such as ten to fifteen pounds per square inch.

Generally the digester employed remains entirely open, or at least vents freely to the air, so that the temperature of the charge will not exceed the usual boiling-point of the particular solution chosen. The need for careful supervision and as well the risk of overheating and decomposing the rubber are thus quite avoided. Much the same result would ensue were the devulcanizing vessel kept under uniform low pressure or were a closed vessel chosen from which at intervals the pressure was blown off; but as pressure is wholly needless a freely-vented digester is generally taken. In that case the foul gases evolved pass away at once as soon as formed through suitable piping, to the relief of the operator and to the better devulcanization of the waste. The vessel being open permits of frequent inspection of the charge.

Ordinarily as the treatment progresses the small amount of water lost by evaporation can be restored again, so that the strength of solution remains practically constant, as, for instance, an inverted condenser properly located catches the drip and delivers it back again into the charge. Uniformity of action is best attained by stirring the batch constantly.

The time of treatment varies with the quality of the waste, the strength of the solution, and the range of temperature. Good results have been attained in five hours with a supersaturated solution, two hundred and ten parts commercial caustic soda to one hundred parts water, the solution boiling at 350° Fahrenheit under ordinary pressure. Solutions of one hundred and fifty and of one hundred and twenty parts of caustic, respectively, to one hundred parts water, with boiling-points at 320° and 300° Fahrenheit, required ten and sixteen hours, severally. Solutions of exceeding strength, while they save time at the regenerating stage, consume more time later on for washing.

Various sorts of apparatus can be used for practice of the invention. The accompanying drawing shows a suitable vessel 10 capable of containing a charge of from four thousand to five thousand pounds. A charging-door 11 is provided at the vessel-top and a discharge-door 12 at the bottom. A vent-pipe 13, leading from the top of vessel 10, communicates with coil 14 of an inverted condenser 15, which latter is provided with water inlet and outlet pipes 16 17. A pipe 18 leads from the condenser-coil to the outside of the building. A stirrer 19 within the devulcanizing vessel 10 is driven from counter-shaft 20 through medium of beveled gears 21 or other suitable manner. Heat is applied to vessel 10 by a steam-chamber 22, upon which the vessel rests. A pipe 23 leads high-pressure or superheated steam into chamber 22, and a suitable drip-pipe 24 leads therefrom. Pipes 22 23 are provided with valves 25 26.

In carrying out the process the rubber waste is first ground or otherwise finely divided. The finely-divided waste is then mixed with the caustic soda, either directly in the vessel 10 or else in a preliminary mixing-receptacle, as may be convenient, by placing therein alternate layers of rubber and caustic soda and from time to time adding the requisite amount of water until the charge is made up.

The proportion of waste, chemical, and water varies with the nature of the material to be treated. Preferably one pound of water and from one to two pounds of caustic for each pound of rubber will be about right. After the charge is made up it is heated in vessel 10 to the boiling-point of the liquid and is kept there under constant agitation by stirrer 19 until digestion of the batch is finished. The sulfid and other gases evolved pass off through pipes 13 14 18. The water vaporized from the charge traps in coil 14 of the inverted condenser and flows back again into vessel 10, so that the strength of the solution remains practically the same. The temperature is evenly maintained at or near the boiling-point of the solution despite any rise in temperature at the source of heat-supply, since the pressure at the charge is practically that of the atmosphere. It is not essential that temperature and pressure be absolutely maintained at certain points, but only that they should not vary within wide limits.

Means other than the return-flow condenser could be adopted to prevent any marked change in the volume of solution. For example, water might be added from time to time or an automatic cock be employed to maintain a constant level within the devulcanizing vessel. It is not necessary that the percentage of water and caustic present should be always the same. It is only essential that the proportions should not fluctuate widely, causing a marked shift in the boiling-point, enough water being always present to guard against overheating and decomposition of the rubber.

The vessel may be heated over an open fire if freely vented or if the pressure be blown off from time to time. The charge might be heated by injection of superheated steam.

After treatment the solution is drained off and may be used again for succeeding charges. The rubber is washed and dried as usual.

While either a strong or a supersaturated solution of caustic soda is believed to be by far the most practical, other chemical solutions may be taken. For example, mixed solutions of caustic soda with common salt or caustic and some of the iodids, chlorids, or hyposulfites, the object being to form a solution which in the open air or under low pressure will boil above the melting-point of sulfur and without excessive loss of volume, afford the temperature requisite for easy despatch of the work. Compounds of this sort are acceptable if they serve to soften the rubber and to remove its sulfur and the associated fillers.

To remove the "surface bloom," it has long been customary in the manufacture of elastic-rubber threads, bands, &c., to simmer the freshly-vulcanized wares during several hours in comparatively strong solution—e. g., twelve per cent.—of caustic soda. At gentle heat the minute sulfur crystals that constitute the bloom gradually react with the soda and dissolve away. The treatment was merely superficial and was ended just as soon as the surface of the goods had been thoroughly cleansed.

More recently it has become familiar practice to use a weak solution of caustic soda—e g., three per cent.—in the reclamation of vulcanized-rubber waste. The finely-shredded refuse or shoddy, together with the caustic solution, was digested at about 344° Fahrenheit in a closed vessel, say, for twenty hours by aid of free steam admitted under high pressure to the vessel-jacket. Being completely isolated from the steam, the caustic solution in the charge suffered no further dilution through chance condensation of steam. The choice of a low uniform percentage of caustic in solution was doubtless meant to save the rubber from becoming "over tacky," as might seem to be the risk at the high temperature chosen for the treatment.

Contrary to prior practice, the present invention sets no limit to the strength of the caustic solution to be taken. Even the "dry" salt, so called, containing a minor percentage of water and melting at high heat to a syrupy condition, may be used, although never to advantage, since it compels close attention to prevent overheating the rubber and demands repeated washing of the product for thorough cleansing.

Solutions of high strength, boiling in the air at temperatures beyond the melting-point of sulfur, and more especially solutions saturated or supersaturated so as to attain a boiling-point at 300° to 350° Fahrenheit, are best suited for practice of the method. They readily attack a large variety of fillers, together with sulfur, both free and combined, while the caustic is always present in ample quantity, copious enough to speed the treatment and eventually to recover a fine waste possessed of peculiar characteristics all its own.

Obviously the percentages, degrees of heat, and duration of treatment stated are given merely in way of example and are not to be taken as in limitation. Persons skilled in the art will recognize that extensive changes can be made without essential departure from the scope of the advance.

Having thus described my invention, what I claim as new, and desire to secure by Letters Patent, is—

1. The method of devulcanizing rubber waste, which consists in subjecting the same in small fragments to a chemical solution having a boiling-point substantially equal to or in excess of the melting-point of sulfur, and then heating the charge.

2. The method of devulcanizing rubber waste, which consists in subjecting the same in small fragments to an alkaline solution approximately saturated or supersaturated at ordinary temperature but held liquid without excessive pressure at the temperature of treatment, and then heating the charge.

3. The method of devulcanizing rubber waste, which consists in subjecting the same in small fragments to a caustic solution approximately saturated or supersaturated at ordinary temperature but held liquid without excessive pressure at the temperature of treatment, and then heating the charge, whereby the caustic acts chemically and physically as well to maintain equable heat in avoidance of destructive distillation of the rubber while devulcanization proceeds.

4. The method of devulcanizing rubber waste, which consists in subjecting the charge in small fragments to an approximately saturated or supersaturated alkaline solution under pressure, heating the charge, and maintaining the same practically constant in volume.

5. The method of devulcanizing rubber waste which consists in admixing the shredded refuse with an alkaline solution, approximately saturated or supersaturated at ordinary temperature, and digesting the charge without material pressure, under high heat corresponding approximately to the boiling-point of the selected solution, substantially as described.

RAYMOND B. PRICE.

Witnesses:
ALBERTA ADAMICK,
LILLIAN PRENTICE.